United States Patent
Rao et al.

(10) Patent No.: US 9,124,522 B2
(45) Date of Patent: Sep. 1, 2015

(54) MULTI-LEVEL RECOVERY IN TRANSPORT NETWORKS

(71) Applicant: Infinera Corp., Annapolis Junction, MD (US)

(72) Inventors: Rajan Rao, Fremont, CA (US); Abhijit Kulkarni, Vidyaranyapura (IN); Muhammad Yaaseen, New Tippasandra (IN); Biao Lu, Saratoga, CA (US); Mohit Misra, Sarjapur Village (IN); Anthony W. Jorgenson, Fremont, CA (US); Tjandra Trisno, San Jose, CA (US); Yalin Wang, Saratoga, CA (US); Khuzema Pithewan, Karnataka (IN); Keshava M. Elliadka, Sunnyvale, CA (US)

(73) Assignee: Infinera Coporation, Sunnyvale, CA (US)

( * ) Notice: Subject to any disclaimer, the term of this patent is extended or adjusted under 35 U.S.C. 154(b) by 0 days.

(21) Appl. No.: 13/853,815

(22) Filed: Mar. 29, 2013

(65) Prior Publication Data

US 2014/0146663 A1  May 29, 2014

Related U.S. Application Data

(60) Provisional application No. 61/730,165, filed on Nov. 27, 2012.

(51) Int. Cl.
*H04L 12/28* (2006.01)
*H04L 12/703* (2013.01)
*H04L 12/707* (2013.01)

(52) U.S. Cl.
CPC ............... *H04L 45/28* (2013.01); *H04L 45/22* (2013.01)

(58) Field of Classification Search
CPC .......................... H04L 45/28; H04L 45/22
See application file for complete search history.

(56) References Cited

U.S. PATENT DOCUMENTS

| | | | | |
|---|---|---|---|---|
| 2004/0205239 | A1* | 10/2004 | Doshi et al. | 709/241 |
| 2010/0118696 | A1* | 5/2010 | Tanuma | 370/225 |
| 2011/0122764 | A1* | 5/2011 | Ramakrishnan et al. | 370/223 |
| 2014/0126898 | A1* | 5/2014 | Magill et al. | 398/4 |

* cited by examiner

*Primary Examiner* — Clemence Han
(74) *Attorney, Agent, or Firm* — Dunlap Codding PC; David L. Soltz

(57) ABSTRACT

Nodes and methods are disclosed for protection and restoration to protect against multiple failures for multiple paths involved for the same service in mesh networks, including, determining, by circuitry of a first node in a mesh network, a failure of a working path between the first node and a second node, wherein the second node, when triggered by the failure of the working path, switches to a protection path. Methods further include establishing through transmission of at least one signal by circuitry of the first node at least one recovery path, for example, a restored-working path, after determining the failure of the at least one working path, wherein the at least one restored-working path carries a duplicate of the data traffic transmitted on the protection path in case of failure of the protection path.

19 Claims, 13 Drawing Sheets

MULTI-LEVEL RECOVERY IN TRANSPORT NETWORKS

INCORPORATION BY REFERENCE

The present patent application claims priority to Provisional Patent Application U.S. Ser. No. 61/730,165 titled MULTI-LEVEL RECOVERY IN TRANSPORT NETWORKS, filed on Nov. 27, 2012, the entire contents of which are hereby expressly incorporated herein by reference.

FIELD OF THE DISCLOSURE

The disclosure generally relates to methods and apparatuses for multi-level recovery in transport networks. More particularly the disclosure relates to methodologies for protection and restoration to protect against multiple failures for multiple paths involved for the same service in mesh networks. Though the methodologies set forth herein are in the context of traffic engineering (TE) routing in optical transport networks (OTN), such methodologies may be applied to any transport network that utilize protection and recovery provisioning.

BACKGROUND

Traffic Engineering (TE) is a technology that is concerned with performance optimization of operational networks. In general, Traffic Engineering includes a set of applications mechanisms, tools, and scientific principles that allow for measuring, modeling, characterizing and control of user data traffic in order to achieve specific performance objectives.

A circuit switched network usually includes multiple switch nodes (also referred to as "nodes") which are arranged in a topology referred to in the art as a "mesh network". Within the mesh network, user traffic can be transported between any two locations using predefined connections specifying particular links and/or switch nodes for conveying the user traffic.

The switch nodes in the mesh network are each provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS)".

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel.

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. The headend node or tailend node initially selects to receive data over the working connection (such as an optical channel data unit label switched path) and then, when a working connection fails, the headend node or tailend node selects a protecting connection for passing data within the mesh network. The set up and activation of the protecting connections may be referred to as restoration or protection.

Dedicated protection mechanisms, where network resources are committed to act as backup for working connections, have been in use for some time. However, existing recovery mechanisms are not adequate to handle switching and reversion when multiple paths and multiple failures are involved for the same service. Systems and methods are needed for multi-level recovery (MLR), and for implementation of such protection, in order to increase network speed, reliability, and resilience.

SUMMARY

A method and system are disclosed. The problem of inadequate mechanisms for addressing multiple path failures in mesh networks is addressed through methods and systems combining restoration, dedicated protection, and monitoring.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
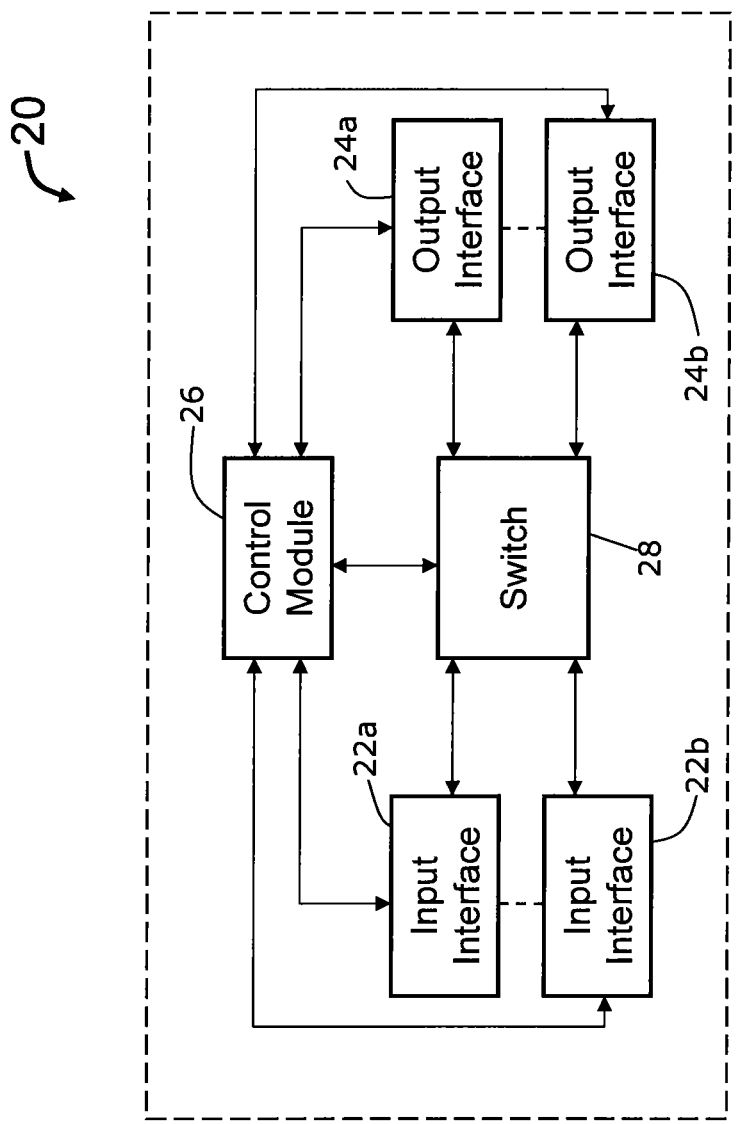
FIG. 1 is a block diagram of an exemplary node constructed in accordance with the present disclosure for communicating via a mesh network.

The following detailed description refers to the accompanying drawings. The same reference numbers in different drawings may identify the same or similar elements.

The mechanisms proposed in this disclosure circumvent the problems described above. The present disclosure describes methods and systems for determining, by circuitry of a first node in a mesh network, a failure of at least one working path between the first node and a second node in the mesh network, wherein the at least one working path carries data traffic from the first node to the second node in the network when there is no failure in the working path, wherein the second node simultaneously receives a duplicate of the data traffic from a protection path between the first node and the second node and wherein the second node, when triggered by the failure of the working path, switches to the protection path; and establishing, by circuitry of the first node, through transmission of at least one signal through an output interface of the first node to an input interface of the second node, at least one restored-working path after determining the failure of the at least one working path, wherein the at least one restored-working path carries a duplicate of the data traffic transmitted on the protection path, for example, in case of failure of the protection path.

In one embodiment, the at least one working path utilizes one or more network resources and, upon the second node switching to the first protection path and establishment of the restored-working path, the one or more network resources may be released.

In one embodiment, the restored-working path utilizes one or more network resources, and, when the failure of the at least one working path is resolved such that the at least one working path is restored for data traffic, the data traffic may be switched to the at least one working path and the one or more network resources of the restored-working path may be released.

In one embodiment, the working path utilizes one or more network resources and the restored-working path may utilize one or more of the network resources of the working path which have not failed.

In one embodiment, methods include transmitting, by circuitry of a first node in a mesh network, through an output interface of the first node, a first signal to an input interface of a second node in the mesh network, the first signal establishing a working path and a protection path between the first node and the second node, wherein the working path carries data traffic from the first node to the second node when there is no failure in the working path, wherein the second node simultaneously receives a duplicate of the data traffic from the protection path and wherein circuitry of the second node, when triggered by the failure of the working path, switches to the protection path. Methods may further include detecting, by circuitry of the first node in the mesh network, failure in the working path; and transmitting, by circuitry of the first node, through the output interface of the first node, a second signal to the input interface of the second node, the second signal establishing a restored-working path, wherein the restored-working path carries a duplicate of the data traffic transmitted on the protection path from the first node to the second node in case of failure of the protection path.

The methods may also include detecting, by circuitry of the first node, a failure in the protection path; and transmitting, by circuitry of the first node, through the output interface of the first node, to the input interface of the second node, a third signal establishing a restored-protection path, wherein the restored-protection path carries a duplicate of the data traffic transmitted on the restored-working path from the first node to the second node in case of failure of the restored-working path.

In one embodiment, the working path, protection path, restored-working path, and restored-protection paths may be diverse from one another, that is, not using network resources used by one or more or all of the other paths.

DEFINITIONS

If used throughout the description and the drawings, the following short terms have the following meanings unless otherwise stated:

APS stands for Automatic Protection Switching.

BDI stands for Backward Defect Indication, which can convey, towards the source, a signal fail status detected in a connection termination sink function.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance.

OTN stands for Optical Transport Network which includes a set of optical switch nodes which are connected by optical fiber links. ITU-T recommendations G.709 and G.872 define OTN interface requirements and network architecture respectively.

PCC stands for Protection Communication Channel.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
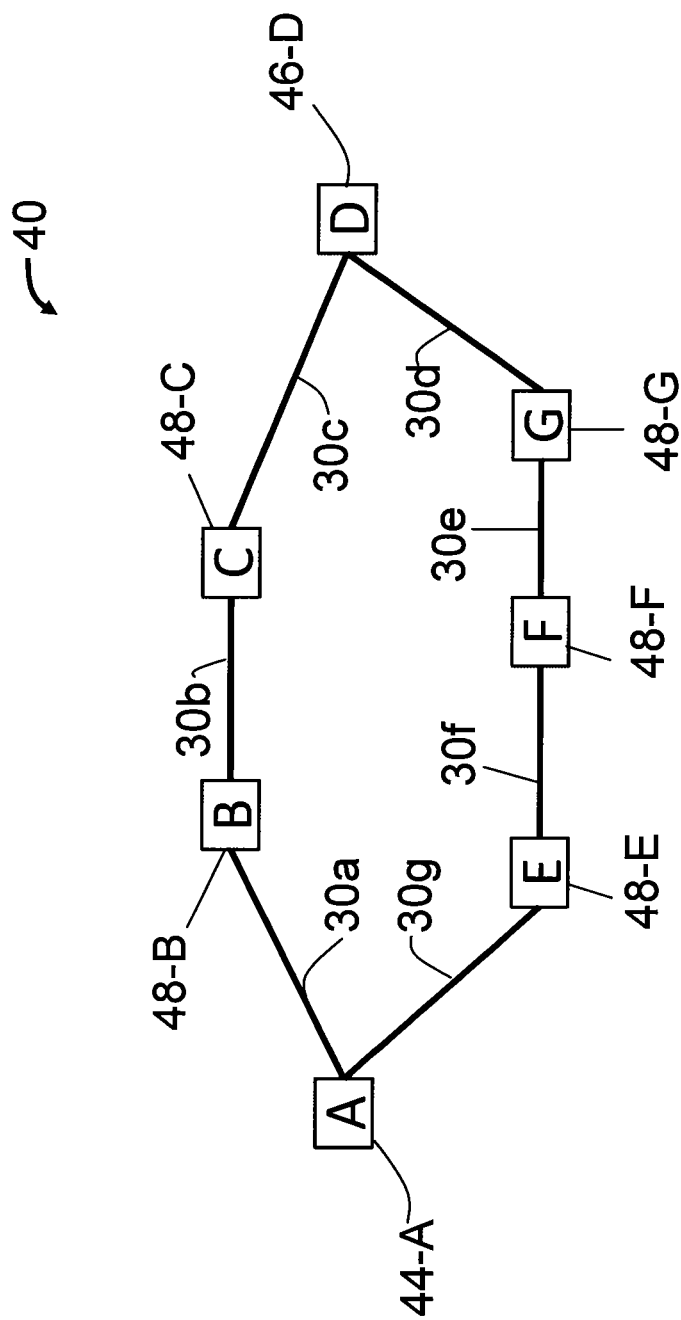
FIG. 2 is a schematic diagram of an exemplary mesh network.

Referring now to the drawings, and in particular to FIG. 1, shown therein and designated by reference numeral 20 is a block diagram of an exemplary node constructed in accordance with the present disclosure. The node 20 is adapted to facilitate the communication of data (which may be referred to herein as "traffic" and/or "data traffic") between multiple nodes 20 in a mesh network 40, as shown in FIG. 2. The mesh network 40 may be, for example, an optical transport network (OTN).

The node 20 is provided with one or more input interfaces 22, one or more output interfaces 24, a control module 26, and a switch 28. In general, the input interfaces, shown here as 22a and 22b, are adapted to receive traffic from the mesh network 40, and the output interfaces, shown here as 24a and 24b, are adapted to transmit traffic onto the mesh network 40 (see FIG. 2). The switch 28 serves to communicate the traffic from the input interfaces 22a and 22b, to the output interfaces 24a and 24b. And, the control module 26 serves to control the operations of the input interfaces 22a and 22b, the output interfaces 24a and 24b, and the switch 28, as well as to set up label switched paths within the mesh network 40. The node 20 may also include non-transitory memory (not shown), either within the control module 26 and/or the switch 28, or separate from the control module 26 and/or the switch 28.

The node 20 can be implemented in a variety of ways, including, commercial installations having one or more backplanes (not shown), racks, and the like. In this example, the input interface(s) 22, the output interface(s) 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interface(s) 22, the output interface(s) 24, the control module 26 and the switch 28 share a power supply and/or housing.

The input interface(s) 22 and the output interface(s) 24 of one node 20 are adapted to communicate with corresponding input interface(s) 22, and output interface(s) 24 of another node 20 within the mesh network 40 via communication links 30, as shown in FIG. 2. An example of an input interface 22 and/or an output interface 24 is an Ethernet card or optical port. In general, each of the input interface(s) 22 and/or the output interface(s) 24 may have a unique logical identification, such as an IP address. The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

The implementation of the input interface(s) 22, and the output interface(s) 24 will depend upon the particular type of communication link 30 that the particular input interface 22 and/or output interface 24 is designed to communicate with. For example, one of the input interfaces 22 can be designed to communicate wirelessly with another node 20 within the mesh network 40, while one of the output interfaces 24 of the node 20 can be designed to communicate optically through a fiber-optic link. For a particular node 20, the input interfaces 22a and 22b can be of the same type or different types; the output interfaces 24a and 24b can be of the same type or different types; and the input interface(s) 22 and output interface(s) 24 can be of the same type or different types.

The input interface 22 and the output interface 24 are shown separately for purposes of clarity. However, it should be understood that one or more of the input interfaces 22 and/or the output interfaces 24 could be connected to a single communication link 30 and implemented as a single device, such as a line module. Exemplary line modules and nodes are described in U.S. Pat. No. 8,223,803 (Application Publication number 20090245289), entitled "Programmable Time Division Multiplexed Switching," the entire contents of which are hereby incorporated herein by reference. Further, it should be understood that the node can be implemented in a variety of manners.

A schematic diagram of an exemplary mesh network 40 is shown in FIG. 2, by way of example. In FIG. 2, the mesh network 40 includes nodes 20 labeled as A, B, C, D, E, F, and G. Some of the nodes 20 are denoted as a headend node 44 (also known as a source node) or tailend node 46 (also known as a destination node) for a particular path in accordance to the path setup direction. Other nodes 20 are known as intermediate nodes 48. In this example, the mesh network 40 includes headend node 44-A; tailend node 46-D; and intermediate nodes 48-B, 48-C, 48-E, 48-F, and 48-G connected by links 30a-30g.

In accordance with the present disclosure, messages transmitted between the nodes 20 can be processed by circuitry within the input interface(s) 22, and/or the output interface(s) 24 and/or the control module 26. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Figure 3:
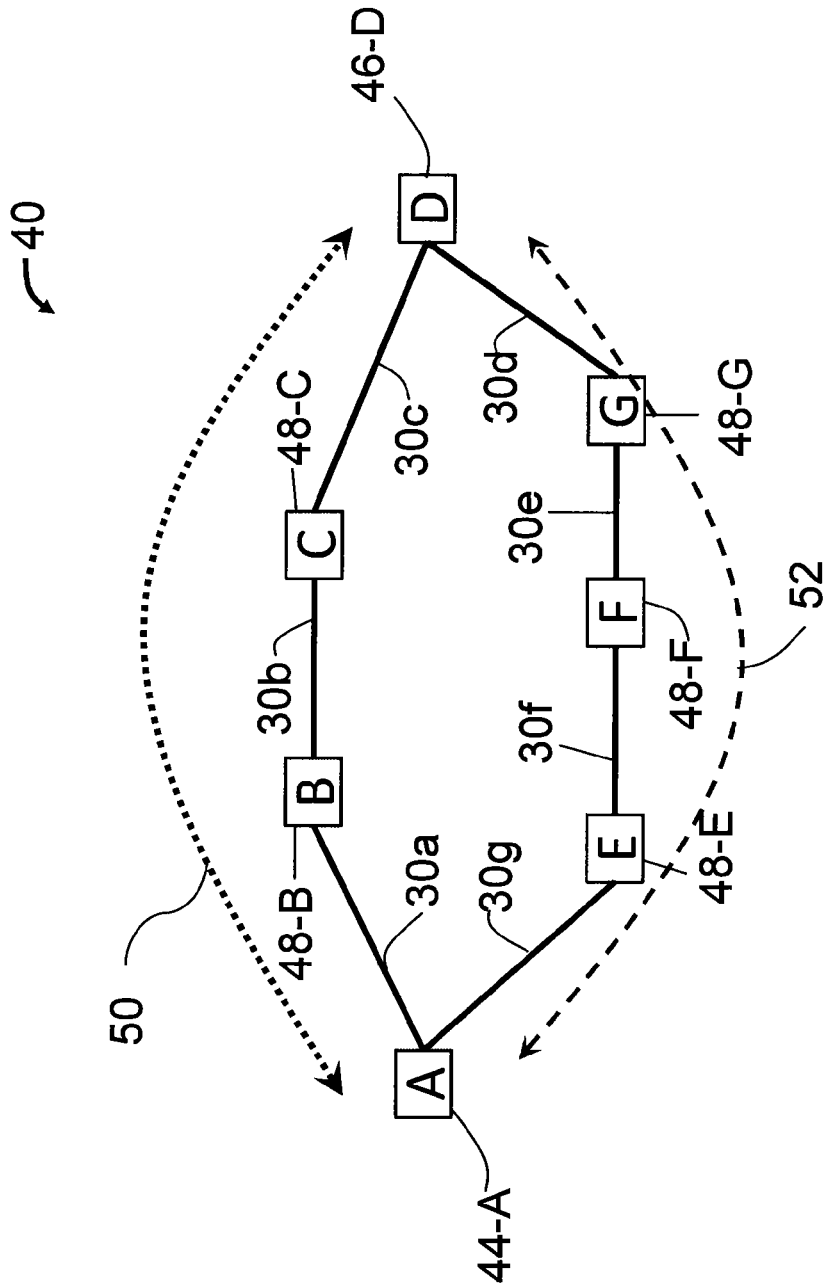
FIG. 3 is a schematic diagram of the mesh network of FIG. 2 showing working and protection paths within the mesh network.

FIG. 3 illustrates the exemplary mesh network 40 depicted in FIG. 2 including working path 50 and protection path 52. In this example, the working path 50 is formed by the communication links 30a-30c and nodes {44-A, 48-B, 48-C, 46-D} and the protection path 52 is formed by the communication links 30g, 30f, 30e, 30d, and nodes {44-A, 48-E, 48-F, 48-G, 46-D}. The working path 50 and the protection path 52 can be established by the nodes 20 A-G prior to any network failure, for example, by using GMPLS protocols. The working path 50 and the protection path 52 may be bi-directional or co-routed. The working path 50 initially carries data traffic and continues to carry data traffic while there is no failure on the working path 50.

In general, dedicated protection, as used herein, refers to a situation in which the headend node 44 or tailend node 46 sets up a dedicated protection path 52 for a particular working path 50, as illustrated in FIG. 3, in case of failure of the working path 50. A type of dedicated protection in accordance with an embodiment of the present disclosure is known in the art as "1+1 Protection." The data traffic is simultaneously transmitted from the headend node 44 (or tailend node 46) on both the working path 50 and protection path 52.

The headend node 44 or the tailend node 46 is responsible for detecting the failure of the working path 50. Once the headend node 44 or the tailend node 46 detects a defect in the working path 50, the headend node 44 or the tailend node 46 may automatically initiate recovery action by selecting the data traffic from the protection path 52. The mechanisms used to detect the failure of the working path 50 are known to those in the art.

In general, during setup, network resources, for example, nodes 20 A-G, communication links 30a-30g, and timeslots (not shown), are specified for each path. The working path 50 is activated with the appropriate resources on the intermediate nodes 48-B and 48-C, and the protection path 52 is activated with the appropriate resources on the intermediate nodes 48-E, 48-F, and 48G. The resource assignment may be a part of the control-plane Connection Admission Control (CAC) operation taking place on each node.

In general, logical tables in one or more databases (not shown) may be used to support protection path 52 activation logic. Preferably, the tables include one or more connection tables, one or more logical timeslot tables, and one or more real timeslot tables. The connection table(s) maintains the connection-related information, including label, interfaces, and associated timeslot information for the connections. The logical timeslot table(s) is a timeslot translation table(s) between connections and timeslots. The real timeslot table(s) maintains the timeslot-related information, including the active connections that are currently conveying traffic and reserved connections for all timeslots. A reserved connection means there is not any active traffic on the timeslot. In the situation where the protection path 52 is identified in the connection table, the protection path's 52 associated timeslots can be readily discovered utilizing the logic timeslot table and the real timeslot table.

Generally, in a dedicated protection scheme referred to as "1+1 Protection", data traffic may be simultaneously transmitted on both the working path 50 and the protection path 52 between the headend node 44-A and the tailend node 46-D. The destination node 20 (headend node 44-A and/or tailend node 46-D) initially selects the working path 50 as the provider of the data traffic.

Upon detection of working path 50 failure (for example, if the communication link 30b between intermediate nodes 48-B and 48-C is cut), the destination node 20 (headend node 44-A and/or tailend node 46-D) will simply switch to the protection path 52 as the provider of the data traffic. The switch to the protection path 52 typically takes less than 50 milliseconds (ms) and is automatic at the destination node 20. In bidirectional protection, to coordinate the switchover between the headend node 44-A and tailend node 46-D, an end-to-end switchover request/response exchange may be used, since a failure affecting the bidirectional working path results in both the headend node 44-A and tailend node 46-D switching to the protection path (resulting in receiving traffic over the working path) in their respective directions. Dedicated protection may be used with unidirectional and bidirectional protection, as described in RFC 4872, "RSVP-TE Extensions for E2E GMPLS Recovery" (May 2007).

However, if the mesh network 40 experiences multiple failures, "1+1 Protection" may be insufficient to retain network resiliency and capacity. To address this issue, in accordance with the present disclosure, Multi-Level Recovery (MLR) may be used. In general, Multi-Level Recovery maintains two healthy paths, including one working path and one recovery path, through the mesh network between the headend node 44 and the tailend node 46. Resources on paths that have failed may be released for other network 40 uses, or, the system may include reversion to paths that had failed but have been restored to usability. With MLR, switch completion takes place in a matter of sub-seconds to recover traffic in situations of multiple failures. Additionally, Operation, Administration and Maintenance (OAM) mechanisms are utilized to monitor work, protection, work restored, and protection restored paths.

Figure 4A:
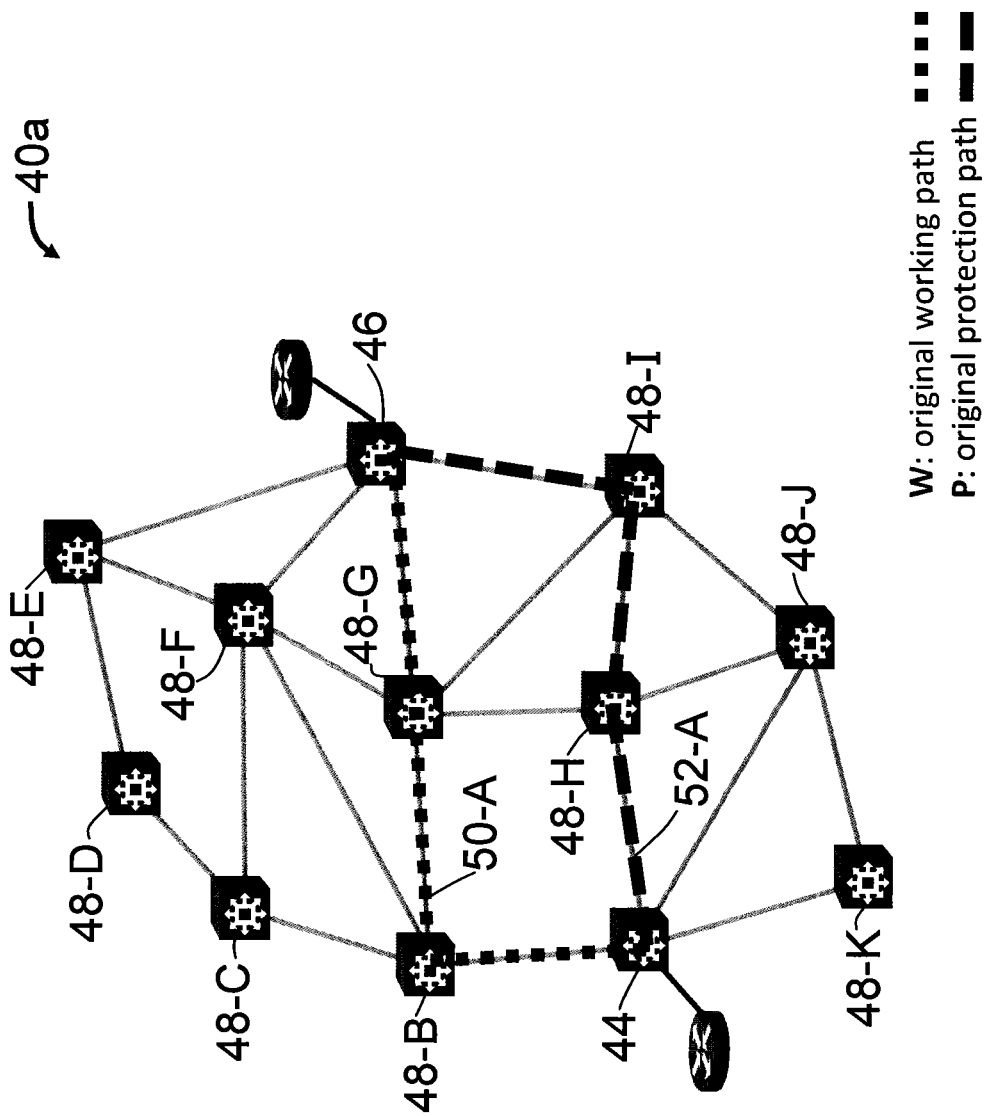
FIG. 4A is a schematic diagram of another exemplary mesh network depicting working and protection paths in accordance with the present disclosure.

For example, FIG. 4A is a schematic diagram of an exemplary mesh network 40a depicting working and protection paths. For purposes of clarity, links 30 are not labeled. In FIG. 4A, utilizing GMPLS protocol, a working path 50-A and a protection path 52-A are established between headend node 44 and tailend node 46 through intermediate nodes 48-B and 48-G and through 48-H and 48-I, respectively. Duplicate data traffic is transmitted simultaneously through the working path 50-A and the protection path 52-A. While there is no failure in the working path 50-A, the destination node, for example, tailend node 46, selects the working path 50-A and receives the data traffic through the working path 50-A. The working path 50-A and the protection path 52-A may be maximally disjoint from each other, that is, not share network resources.

Figure 4B:
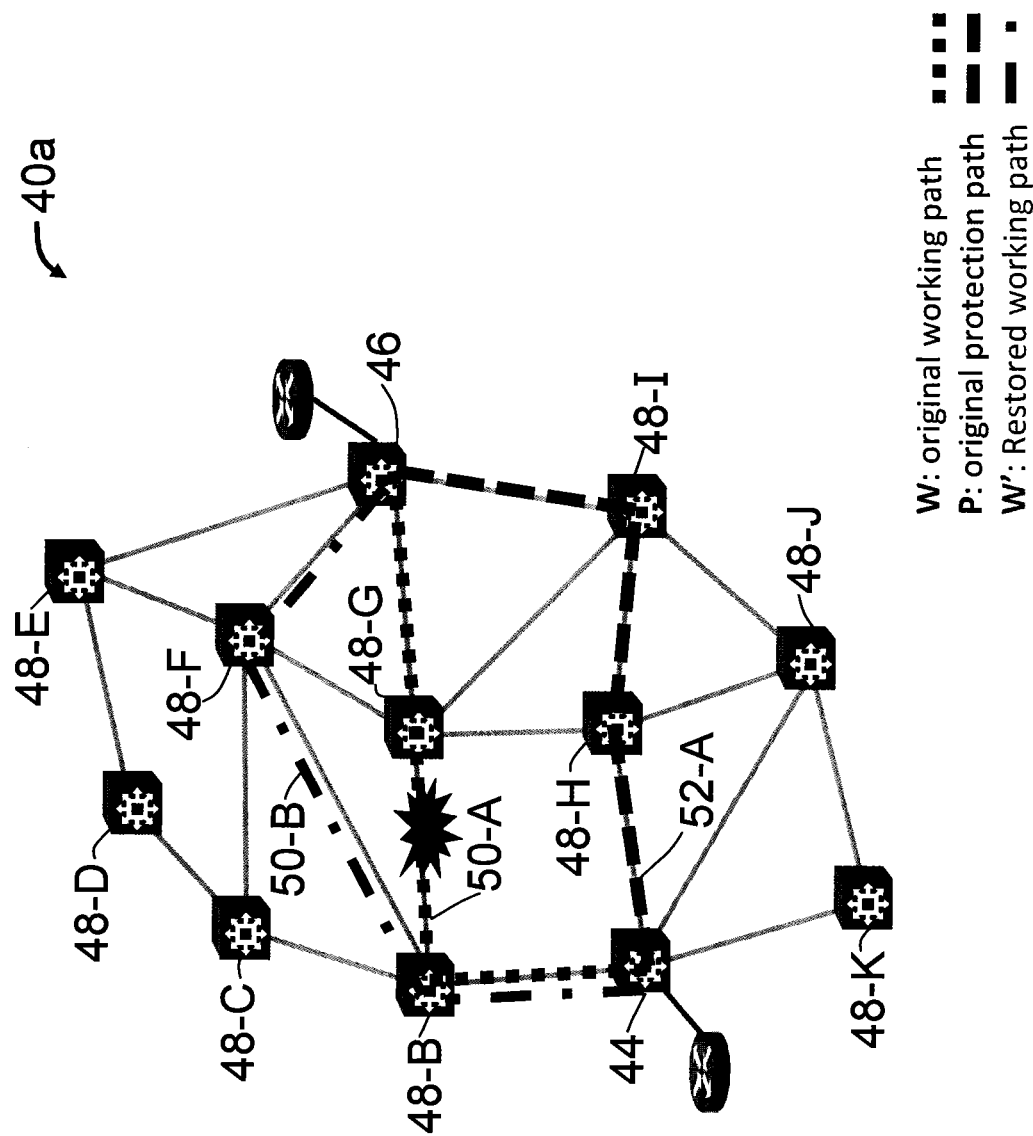
FIG. 4B is a schematic diagram of the exemplary mesh network of FIG. 4A in which a failure has occurred in the working path.

FIG. 4B is a schematic diagram of the exemplary mesh network 40a of FIG. 4A in which a failure has occurred in the working path 50-A. When the destination node, such as tailend node 46, detects the failure in the working path 50-A, the destination node switches to the protection path 52-A, and receives the traffic data via the protection path 52-A. The switching may be unidirectional and independent at the headend node 44 and tailend node 46. Generally, no Automatic Protection Switching (APS) signaling is needed for bidirectional switching coordination. The source node, such as headend node 44, may then establish a replacement recovery path—a "restored working path" 50-B—which is established due to the failure of the working path 50-A and acts as a recovery path for the protection path 52-A. The restored working path 50-B may be maximally disjoint from the working path 50-A and/or the protection path 52-A. In this example, the restored working path 50-B is between headend node 44 and tailend node 46 through intermediate nodes 48-B and 48-F. The headend node 44 may establish the restored working path 50-B by transmitting a signal through the output interface 24 of the headend node 44 to the input interface 22 of the tailend node 46, the signal containing at least one message to establish the restored working path 50-B. The restored working path 50-B then carries a duplicate of the data traffic carried on the protection path 52-A, simultaneous to the data traffic on the protection path 52-A, in case of failure of the protection path 52-A. Before a failure of the protection path 52-A, the tailend node 46 may continue to select data traffic from the protection path 52-A.

Figure 4C:
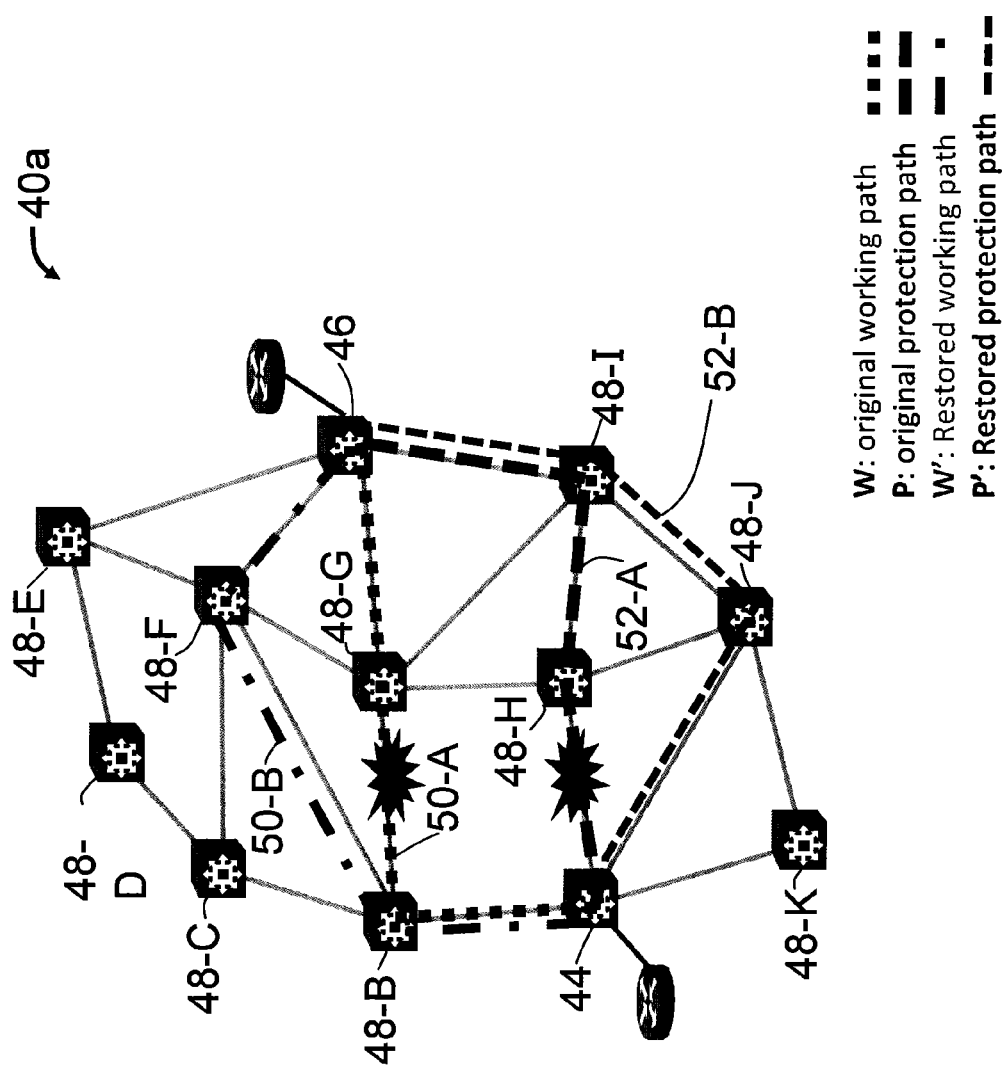
FIG. 4C is a schematic diagram of the exemplary mesh network of FIG. 4B in which a failure has occurred in the working and protection paths.

In one aspect of the present disclosure, this method may be repeated for any number of failures of paths in the network 40a. For example, FIG. 4C is a schematic diagram of the exemplary mesh network 40a of FIG. 4B in which a failure has now occurred in the protection path 52-A, as well as the original failure of working path 50-A. In this example, the destination node, here tailend node 46, selects the restored working path 50-B and may automatically switch to receiving the data traffic from the restored working path 50-B. The switch may take place in 50 ms or less. The source node, such as headend node 44, may then establish another replacement recovery path—a "restored protection path" 52-B—which is established due to the failure of the protection path 52-A and acts as a recovery path for the restored working path 50-B. The restored protection path 52-B may be maximally disjoint from and the working path 50-A, and from the restored working path 50-B, and from the protection path 52-A. In this example, the restored protection path 52-B is between headend node 44 and tailend node 46 through intermediate nodes 48-J and 48-I. The headend node 44 may establish the restored protection path 52-B by transmitting a signal through the output interface 24 of the headend node 44 to the input interface 22 of the tailend node 46, the signal containing at least one message to establish the restored protection path 52-B. The restored protection path 52-B then carries a duplicate of the data traffic carried on the restored working path 50-B, simultaneous to the data traffic on restored working path 50-B, in case of failure of the restored working path 50-B. Before a failure of the restored working path 50-B, the tailend node 46 may continue to select data traffic from the restored working path 50-B.

Figure 4D:
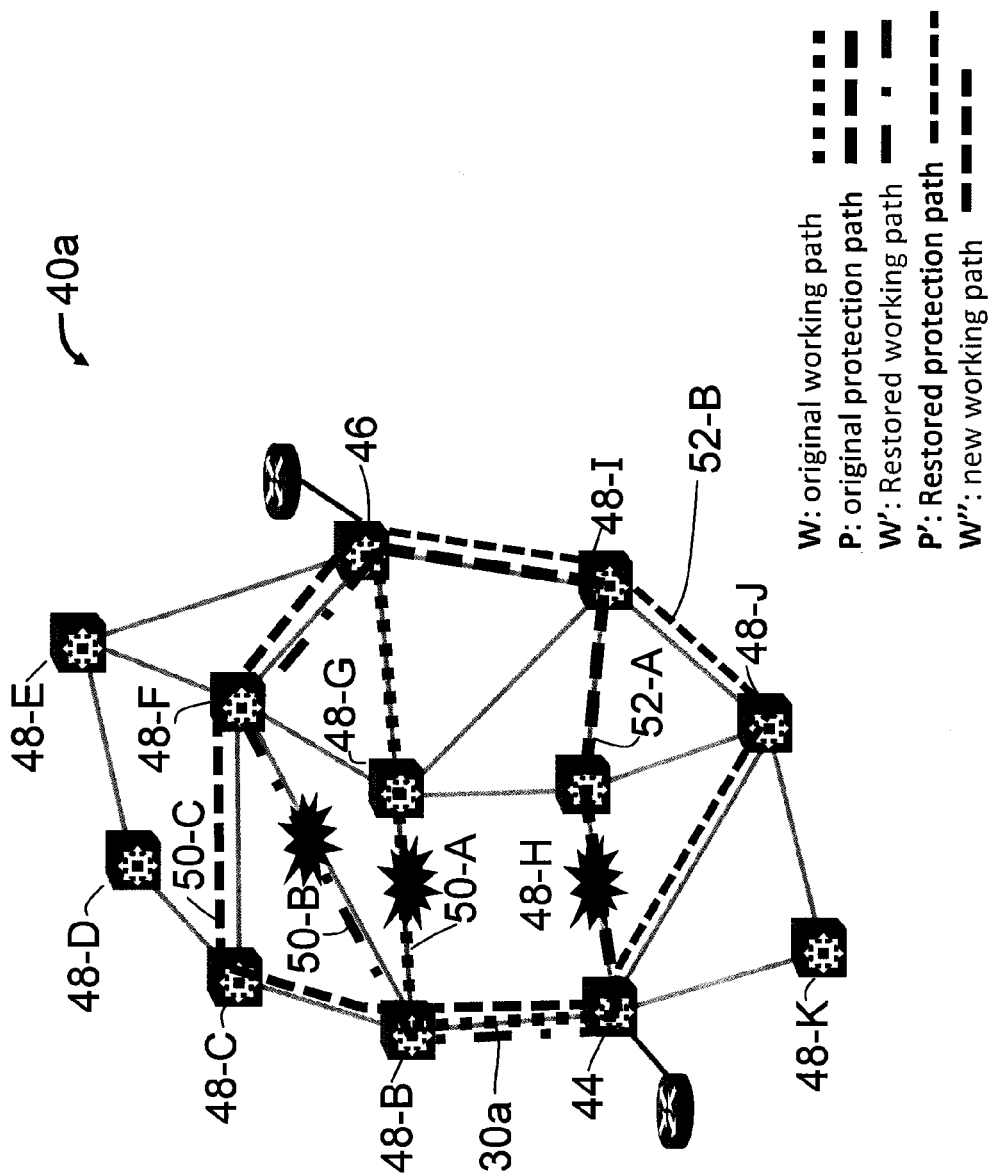
FIG. 4D is a schematic diagram of the exemplary mesh network of FIG. 4C in which a failure has occurred in a restored working path, the protection path, and the working path.

This process may continue iteratively, for example, FIG. 4D is a schematic diagram of the exemplary mesh network 40a of FIG. 4C in which a failure has now occurred in the restored working path 50-B, as well as the protection path 52-A, and the working path 50-A. In this example, the destination node, here tailend node 46, selects the restored protection path 52-B and may automatically switch to receiving the data traffic from the restored protection path 52-B. The switch may take place in 50 ms or less. The source node, such as headend node 44, may then establish another replacement recovery path—a "second restored protection path" 50-C—which is established due to the failure of the restored working path 50-B and acts as a recovery path for the restored protection path 52-B. In this example, the second restored working path 50-C is between headend node 44 and tailend node 46 through intermediate nodes 48-B, 48-C, and 48-F. In this example, the resources of the restored working path 50-B may be released back to the network 40a before the establishment of the second restored protection path 50-C such that the second restored protection path 50-C may utilize one or more of the functioning resources from the failed restored working path 50-B, such as link 30a and intermediate node 48-B. The headend node 44 may establish the second restored working path 50-C by transmitting a signal through the output interface 24 of the headend node 44 to the input interface 22 of the tailend node 46, the signal containing at least one message to establish the second restored working path 50-C. The second restored working path 50-C then carries a duplicate of the data traffic carried on the restored protection path 52-B, simultaneous to the data traffic on restored protection path 52-B, in case of failure of the restored protection path 52-B. Before a failure of the restored protection path 52-B, the tailend node 46 may continue to select data traffic from the restored protection path 52-B.

In one aspect of the present disclosure, a maximum of two paths without failures on the paths (referred to herein as "healthy" paths) may be maintained in the network between the headend node 44 and the tailend node 46. That is, after determining a failure in a path being used by the tailend node 46 to receive data traffic such that the tailend node 46 is triggered to switch to an initial dedicated recovery path (in 50 ms or less), the headend node 44 may establish a replacement dedicated recovery path between the headend node 44 and the tailend node 46. In this example, a dedicated recovery path is a path that is simultaneously transmitting the same data traffic as is transmitted on the path being used to provide the data traffic to the tailend node 46, in case of failure of the path being used by the tailend node to receive the data traffic.

The headend node 44 may continue detecting failures and establishing replacement dedicated recovery paths indefinitely, and/or to the limits of the resources of the network 40. Alternatively, a limit on the number of iterations may be established. For example, the headend node 44 may only establish one replacement recovery path (as illustrated in FIG. 4B with restored working path 50-B).

In one aspect of the present disclosure, if multiple paths fail simultaneously, restoration for one path is attempted first before restoring the other path. An internal "holdOff" timer may be utilized for this process.

In one aspect of the present disclosure, if a path having one of the failures is repaired such that the path is healthy and may carry the data traffic, the headend node 44 may revert the data traffic to the repaired path. The revertive operation may be bidirectional and may include healing of the failed path (for example, via Protection Unit (PU) monitoring), running Wait to Restore, initiating reversion at local node and remote via APS signaling (as will be further described herein), and deletion of the replacement recovery path to release network bandwidth. Typically, a "1+1 Protection" protection group consists of a working protection unit (W-PU) and a protecting protection unit (P-PU). According to one aspect of the present disclosure, a multi-level recovery protection group may include up to four protection units, for example, the working protection unit (W-PU), the protecting protection unit (P-PU), a restored working connection protection unit (W'-PU), and a restored protecting protection unit (P'-PU). The data traffic may be bridged to the paths at a Reliable Termination Point (R-TP).

Reversion may be done in a prioritized order. For example, reversion to the working path 50, if available, may be higher in priority compared to reversion to the protection path 52. For example, returning to FIG. 4B, in the case where the failure in working path 50-A has been resolved such that working path 50-A is capable of carrying the data traffic, then the headend node 44 may begin to transmit the data traffic through working path 50-A to tailend node 46. The headend node 44 and tailend node 46 may stop using the restored working path 50-B and release the resources of the restored working path 50-B, such as bandwidth, back to the network 40a for other uses.

Alternatively, either before or after the failure on the working path 50-A, or other failed path, is repaired, the headend node 44 may transmit one or more signal to release the resources of the working path 50-A or other failed path back to the network 40a for other uses. The headend node 44 may wait a specified amount of time before releasing the resources of the working path 50-A or other failed path.

In one aspect of the present disclosure, one or more recovery paths may utilize one or more resources of one or more of the failed paths. For example, in FIG. 4C, the working path 50-A has a failure between intermediate nodes 48-B and 48-G. However, the link 30a and the intermediate node 48-B are in working order. In this case, the restored working path 50-B may utilize link 30a and intermediate node 48-B as part of restored working path 50-B.

Figure 5:
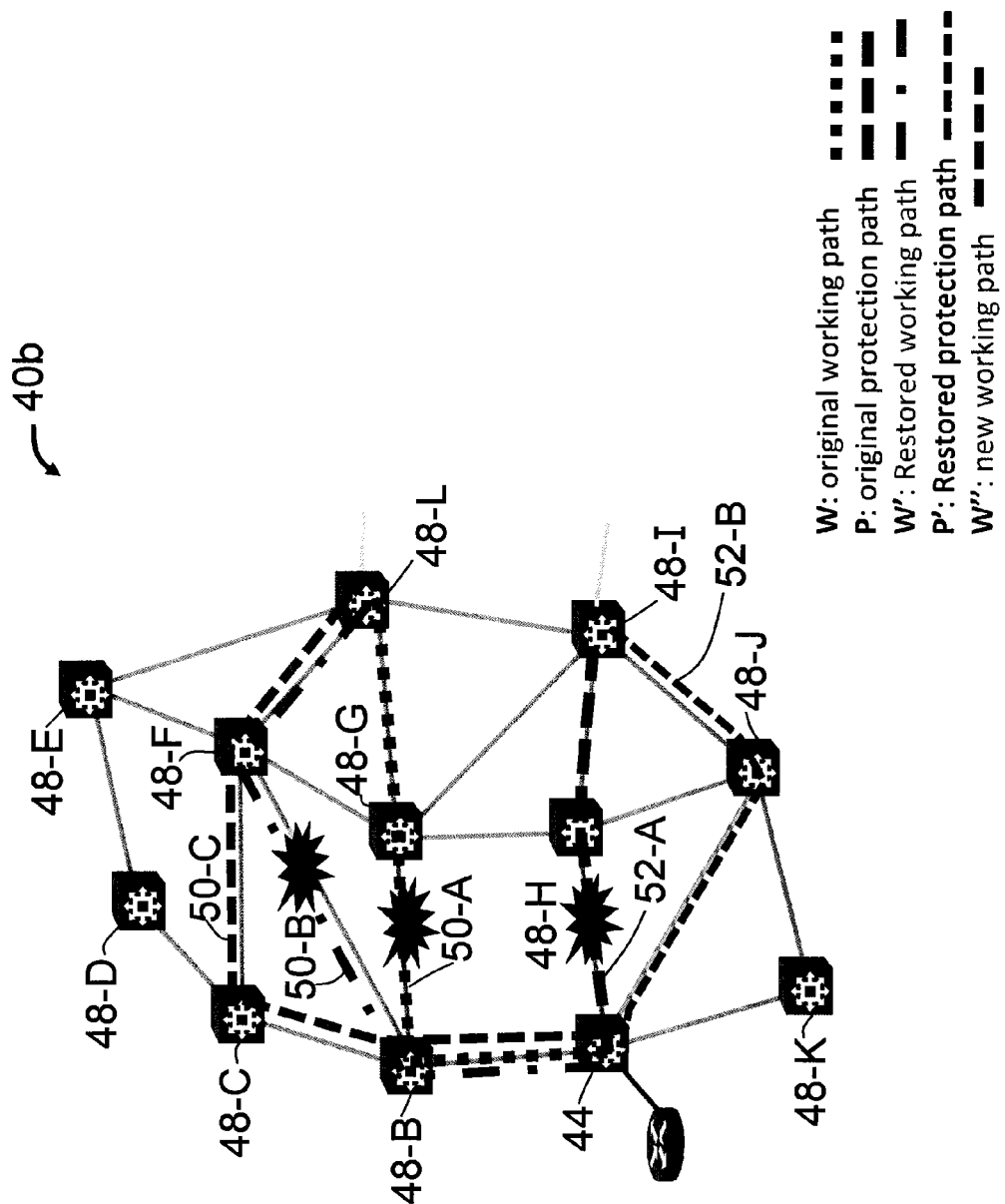
FIG. 5 is a schematic diagram of an exemplary mesh network depicting multiple recovery paths in accordance with the present disclosure.

In one example, the process described in conjunction with FIGS. 4A-4D may be implemented in multiple areas and/or segments of the mesh network 40. For example, FIG. 5 is a schematic diagram of an exemplary mesh network 40b depicting multiple recovery paths in accordance with the present disclosure. This example is identical to that described in conjunction with FIG. 4D, with the exception that, in this example the destination node is beyond the illustrated portion of network 40b. What was tailend node 46 is now illustrated as intermediate node 48-L. Here, the recovery paths end at an intermediate node, such as intermediate nodes 48-I and 48-L while the normal working path 50-A and recovery path 52-A may continue past intermediate nodes 48-I and 48-L.

Figure 6:
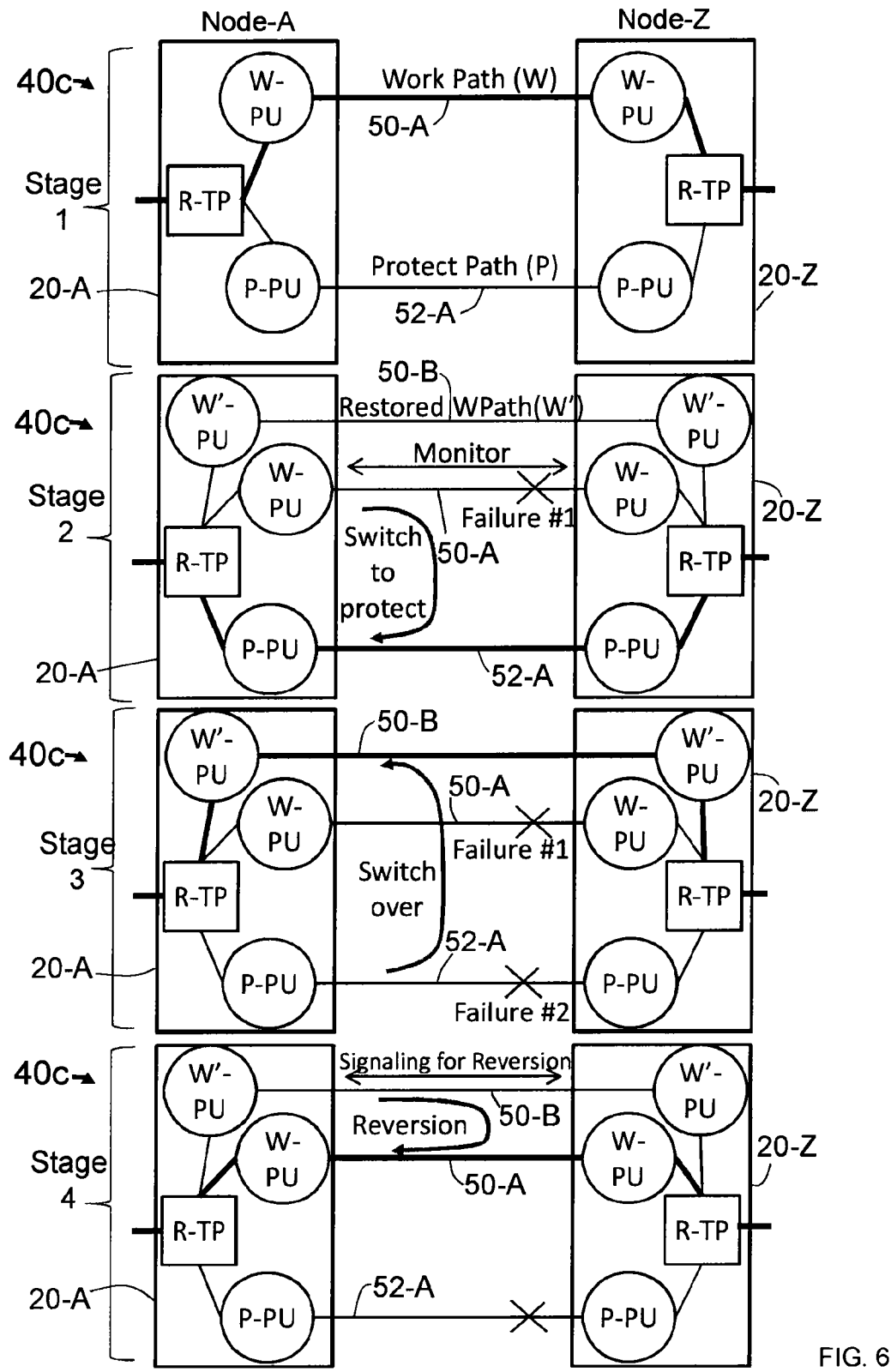
FIG. 6 is a schematic diagram of exemplary stages of failure, recovery, and reversion in an exemplary network in accordance with the present disclosure.

FIG. 6 is a schematic diagram of exemplary stages of failure, recovery, and reversion in an exemplary network 40c in accordance with the present disclosure. Initially, in Stage 1, data traffic is carried between nodes 20-A and 20-Z on working path 50-A and, simultaneously, duplicate data traffic is carried between nodes 20-A and 20-Z on protection path 52-A. The destination node, for example, node 20-Z, initially utilizes the data traffic provided over the working path 50-A and the data traffic carried over the protection path 52-A is available in case of failure of the working path 50-A.

In Stage 2, the working path 50-A has failed, as illustrated in FIG. 6 by an X over the working path 50-A. The destination node, for example, node 20-Z, now switches to receiving the data traffic provided over the protection path 52-A. The switch may occur in 50 ms or less. When the source node, for example, node 20-A, determines there has been a failure in the working path 50-A, the source node signals through the source node output interface 24 to the input interface 22 of the destination node to establish a new recovery path, in this example, restored working path 50-B. Meanwhile, the source node and/or destination node, for example, nodes 20-A and/or 20-Z, may monitor the status of the working path 50-A utilizing OAM mechanisms.

In Stage 3, the protection path 52-A has failed, as illustrated in FIG. 6 by an X over the protection path 52-A. The destination node, for example, node 20-Z, now switches to receiving the data traffic provided over the working path 50-B. The switch may occur in 50 ms or less. Meanwhile, the source node and/or destination node, for example, nodes 20-A and/or 20-Z, may monitor the status of the working path 50-A and/or protection path 52-A utilizing OAM mechanisms. In Stage 4, the failure of the working path 50-A has been resolved such that the working path 50-A is capable of carrying data traffic. The source node, for example node 20-A, may signal the destination node, for example, node 20-Z, to revert back to the working path 50-A as the provider of the data traffic to the destination node 20-Z. The restored working path 50-B may be maintained as a recovery path or torn down to release bandwidth to the network 40c.

Figure 7A:
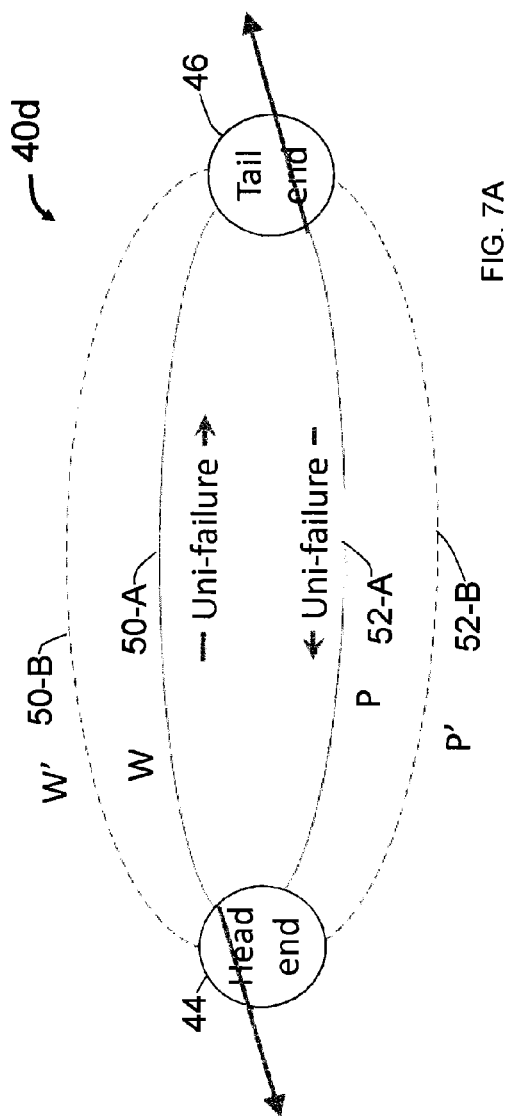
FIG. 7A depicts a schematic diagram of exemplary bidirectional working and recovery paths in an exemplary network in accordance with the present disclosure.

In one aspect of the present disclosure, one or more bidirectional paths may have a failure in one or more direction of the data traffic on the bidirectional path. For example, FIG. 7A depicts a schematic diagram of exemplary bidirectional working and recovery paths in an exemplary network 40d in accordance with the present disclosure. In this example, there is a unidirectional failure in the working path 50-A in the direction of data traffic flowing from the headend node 44 to the tailend node 46. The tailend node 46 may then switch to receiving traffic from the headend node 44 through dedicated protection path 52-A, while continuing to send data traffic to the headend node 44 over the unaffected part of the bidirectional working path 50-A. Also in this example, there is shown a unidirectional failure in the protection path 52-A in the direction of data traffic flowing from the tailend node 46 to the headend node 44. In such a case, the tailend node 46 may continue to receive data traffic from the headend node 44 over the protection path 52-A and may continue to transmit data traffic to the headend node 44 over the working path 50-A.

Figure 7B:
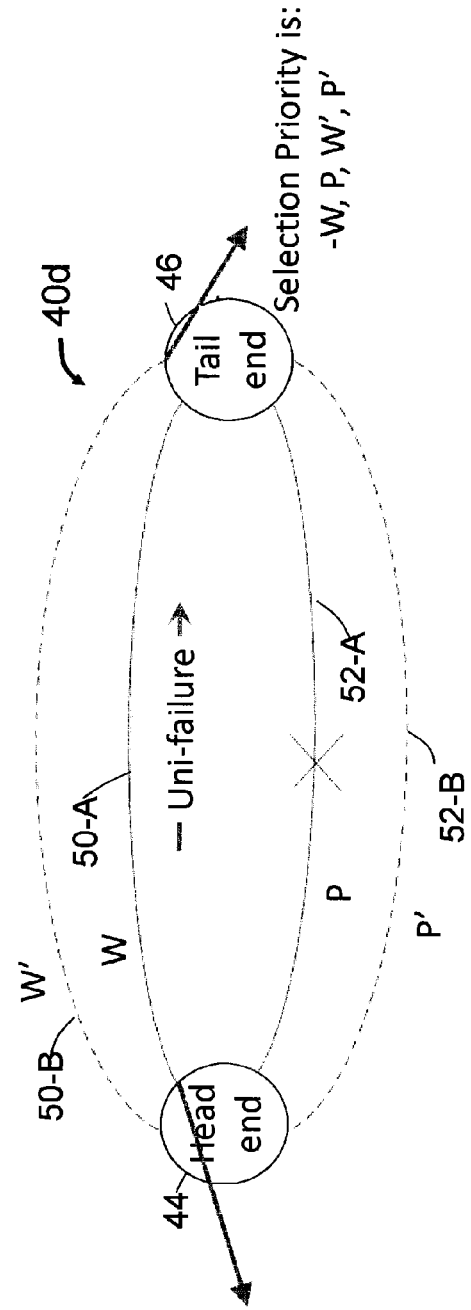
FIG. 7B depicts a schematic diagram of the exemplary network of FIG. 7A depicting failures in the paths.
Figure 7C:
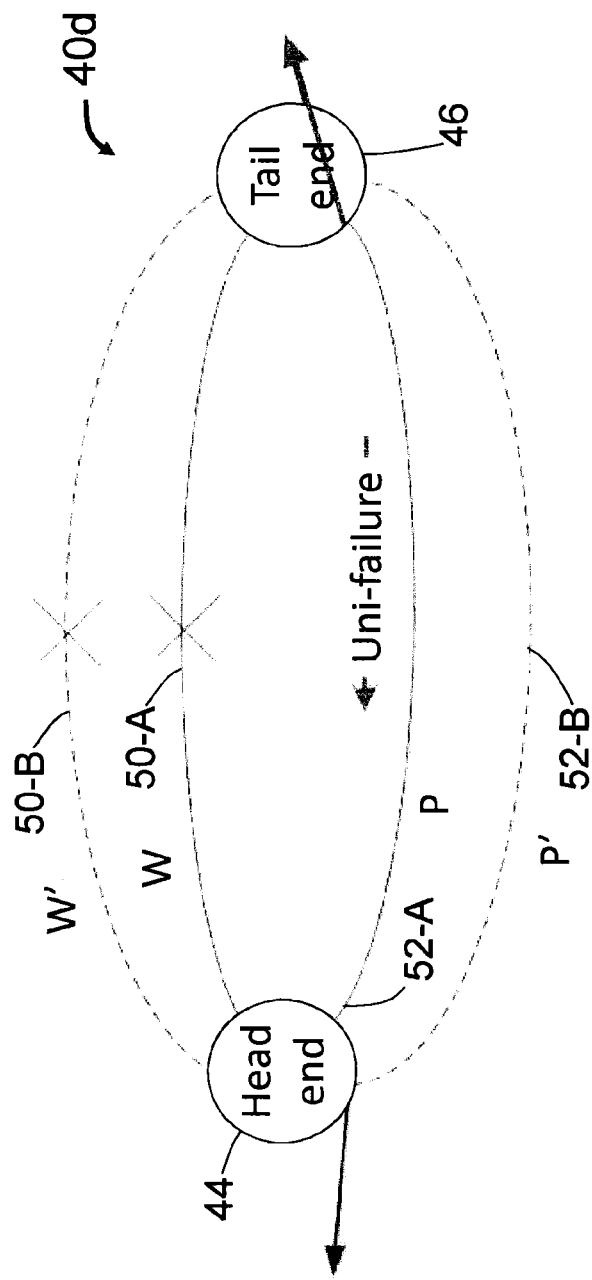
FIG. 7C depicts a schematic diagram of the exemplary network of FIG. 7A depicting other failures in the paths.

In another example, FIG. 7B depicts a schematic diagram of the exemplary network 40d of FIG. 7A in which the bidirectional working path 50-A has failed in one direction and the bidirectional protection path 52-A has failed in both directions. In such an instance, the tailend node 46 may then switch to receiving traffic from the headend node 44 through dedicated restored working path 50-B, while continuing to send data traffic to the headend node 44 over the unaffected part of the bidirectional working path 50-A. In another example, FIG. 7C depicts a schematic diagram of the exemplary network 40d of FIG. 7A in which there is a failure of both directions of the bidirectional working path 50-A and a failure in both directions of the bidirectional restored working path 50-B and a failure in one direction (toward the headend node 44) of the protection path 52-A. In this example, the tailend node 46 may then switch to receiving traffic from the headend node 44 through dedicated protection path 52-A, and the headend node 44 may switch to receiving traffic from the dedicated restored protection path 52-B.

Of course, it should be understood that the recovery paths may be any length or configuration, and that a limited number of intermediate nodes 48 are used in the previous examples for purposes of clarity.

As previously described, the headend node 44 may transmit one or more messages in one or more signal to other nodes in the network 40, such as tailend node 46, in order to coordinate reversion of data traffic to repaired paths and/or in order to delete unneeded paths/resources (for example, failed paths and/or resources from failed paths and/or redundant recovery paths). ITU-T G.709 and G.873.1 define standard current Automatic Protection Switching/Protection Communication Channel (APS/PCC) messages used for "1+1"/"1:1" protection for use in Optical Transport Networks. The headend node 44 and/or tailend node 46 may utilize the currently reserved byte #4 from the APS/PCC standards to coordinate reversion and/or deletion. The APS reserved byte #4 may carry information indicative of Backward Defect Indication (BDI) and readiness for deletion for restoration path(s). The overhead may be bridged to all paths. The overhead may be in the APS/PCC bytes, for example. The APS/PCC bytes may be bridged to the paths as applicable, that is, the same information may be sent on all the paths that exist between headend node 44 and tailend node 46. The tailend node 46 may use the APS bytes from the selected path.

Figure 8:
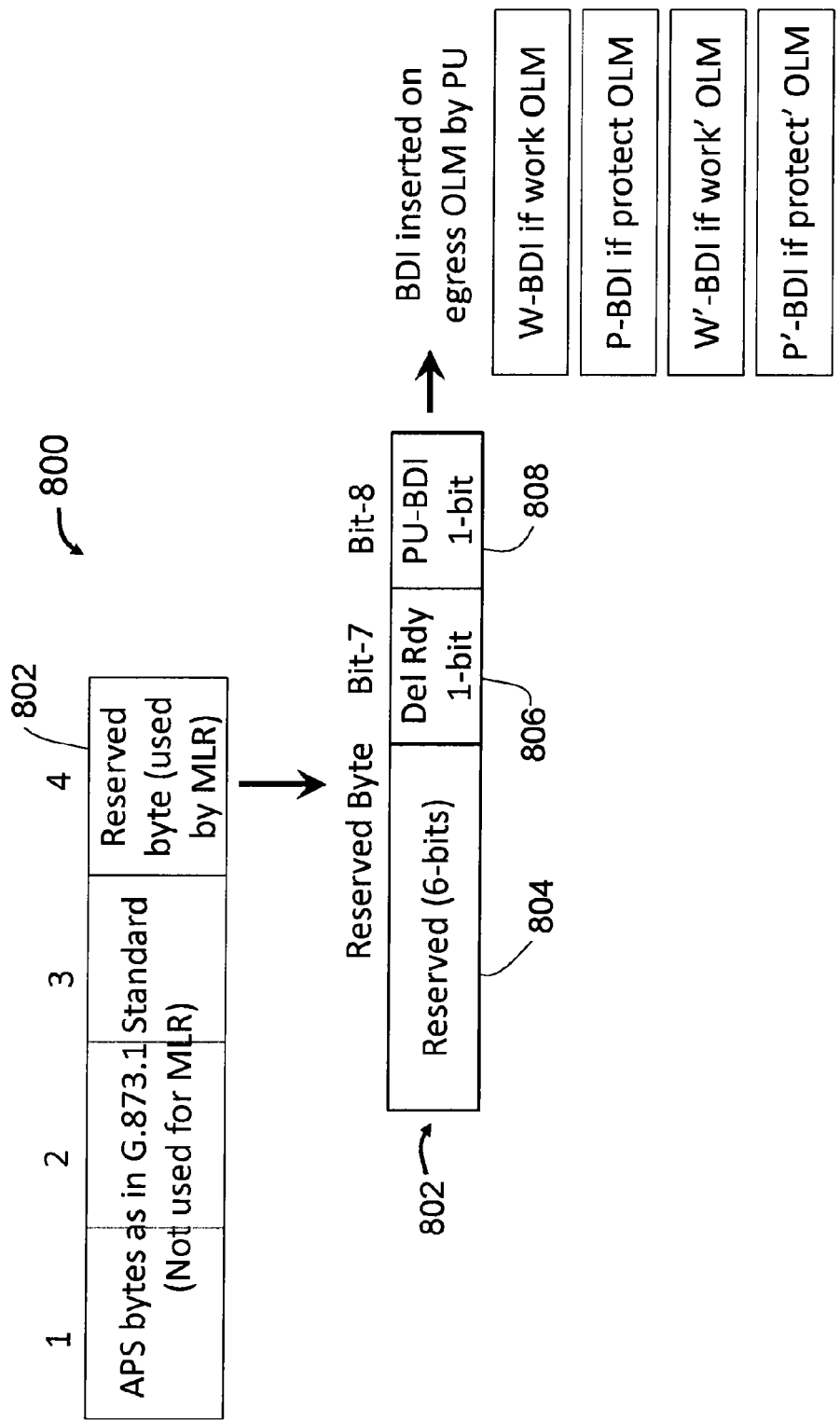
FIG. 8 is a schematic diagram of exemplary Automatic Protection Switching data fields in an exemplary message in accordance with the present disclosure.

FIG. 8 is a schematic diagram of exemplary APS data fields in an exemplary message 800 in accordance with the present disclosure. The Reserved byte #4, illustrated as reference numeral 802, may contain a Reserved field 804 with six bits, a Delete Ready field 806 with one bit, and a PU-BDI field 808 with one bit. The PU-BDI field 808 may convey, towards the source, unidirectional signal fail status for the selected path, such as the working path 50-A, the protection path 52-A, the restored working path 50-B, and/or the restored protection path 52-B. PU-BDI insertion may be done at the line modules. Each path may use the same PU-BDI field 808 bit position but from different line modules.

The Delete Ready field 806 may be used to indicate a path is ready for deletion, for example, the one bit in the Delete Ready field 806 may be set to "one" when the path is ready to be deleted, and then the message 800 may be sent over the path for deletion.

Of course it should be understood that other bytes or different location of data fields may be used to carry out the provisions of the presently described method.

Figure 9:
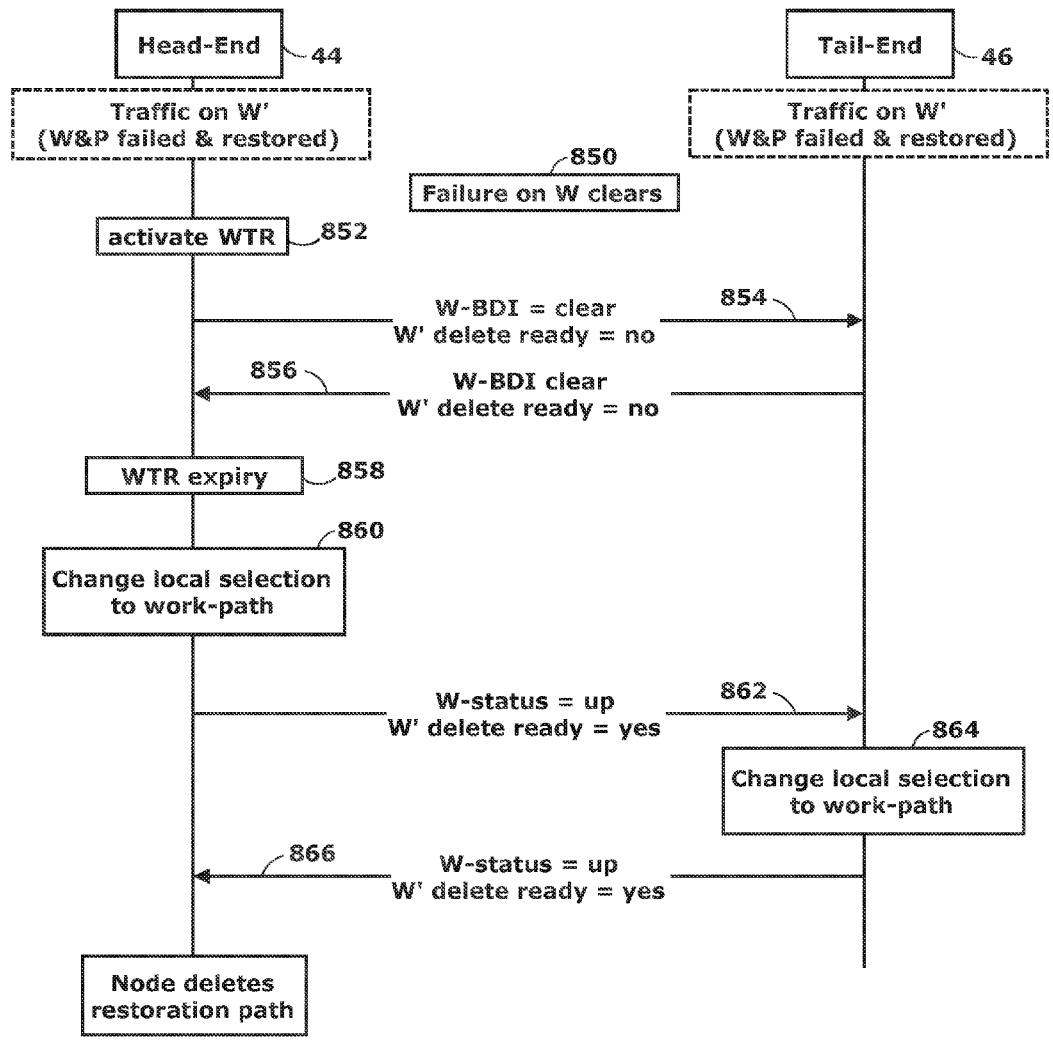
FIG. 9 is a schematic diagram of an exemplary reversion and deletion sequence in accordance with the present disclosure

FIG. 9 is a schematic diagram of an exemplary reversion and deletion sequence in accordance with the present disclosure. In this example, at the start of the sequence, a failure has been detected on the working path 50-A, a failure has been detected on the protection path 52-A, and data traffic is being carried on the restored working path 50-B. Then, as indicated in sequence step 850, the failure on the working path 50-A clears (that is, the failure is gone). The headend node 44 may activate a Wait-To-Restore (WTR) timer, as illustrated in sequence step 852. Next, the headend node 44 may send a first signal 854 to the tailend node 46 through the restored working path 50-B with a message containing the APS data fields previously described, in which the BDI field 808 carries data indicating that the working path 50-A is clear, and in which the Delete Ready field 806 carries data indicating that the restored working path 50-B is not ready to be deleted. Next, the tailend node 46 may send a second signal 856 to the headend node 44 through the restored working path 50-B with a message containing the APS data fields previously described, in which the BDI field 808 carries data indicating that the working path 50-A is clear (that is, the failure is gone), and in which the Delete Ready field 806 carries data indicating that the restored working path 50-B is not ready to be deleted.

Next, at sequence step 858, the WTR timer has expired for the headend node 44 and the headend 44 changes the local selection to the working path 50-A (sequence step 860). The headend node may send a third signal 862 with a message containing the APS data fields previously described, in which the reserved field 804 carries status data indicating that the working path 50-A is up (that is, ready to carry data traffic), and in which the Delete Ready field 806 carries data indicating that the restored working path 50-B is ready to be deleted.

At sequence step 864, the tailend node 46 changes the local selection to working path 50-A. Then, the tailend node 46 sends a fourth signal 866 to the headend node 44 with a message containing the APS data fields previously described, in which the reserved field 804 carries status data indicating that the working path 50-A is up (that is, ready to carry data traffic), and in which the Delete Ready field 806 carries data indicating that the restored working path 50-B is ready to be deleted (since the tailend node 46 is no longer selecting data traffic from the restored working path 50-B). Finally, the headend node deletes the restored working path 50-B. The deletion may be done by GMPLS. The deletion frees the previously reserved bandwidth of the restored working path 50-B for other network 40 uses.

Optionally, sequence step 860 in which the headend node 44 changes local selection to the working path 50-A may occur after the fourth signal 866 is received by the headend node 44 from the tailend node 46.

CONCLUSION

Conventionally, dedicated and shared protection mechanisms for switching and reversion are not resilient or timely under multiple failure scenarios. In accordance with the present disclosure, methods, nodes, and systems are described in which multi-level recovery is implemented utilizing mesh restoration and dedicated protection.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes. In this situation, the nodes may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328 "OSPF Version 2," Moy, J., The Internet Society, April 1998.

RFC3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC3945 Mannie, E., "Generalized Multi-Protocol Label Switching (GMPLS) Architecture", RFC 3945, October 2004.

RFC4379 "Detecting Multi-Protocol Label Switched (MPLS) Data Plane Failures," Kombella, K. and Swallow, G., The Internet Society, February 2006.

RFC4872 "RSVP-TE Extensions for E2E GMPLS Recovery," J. P. Lang, Y. Rekhter, D. Papadimitriou, The Internet Society, May 2007.

RFC4873 "GMPLS Segment Recovery," L. Berger et al, The Internet Society, May 2007.

RFC 5340 "OSPF for IPv6," Coltun et al., The Internet Society, July 2008.

G.709-v3 ITU-T, "Interfaces for the Optical Transport Network (OTN)", G.709 Recommendation, December 2009.

G.872 ITU-T, "Architecture of optical transport networks", November 2001.

What is claimed is:

1. A method comprising the steps of:
   detecting, by circuitry of a first node in a mesh network, a failure of at least one working path between the first node and a second node in the mesh network, wherein the at least one working path carries data traffic from the first node to the second node in the network when there is no failure in the working path, wherein the second node simultaneously receives a duplicate of the data traffic from a protection path between the first node and the second node and wherein the second node switches to the protection path;
   establishing, by circuitry of the first node, through transmission a first signal through an output interface of the first node to an input interface of the second node, at least one restored-working path after determining the failure of the at least one working path;
   establishing, by the circuitry of the first node, through transmission a second signal through the output interface of the first node to the input interface of the second node, at least one restored-protection path after determining a failure of the protection path and after said establishing the restored-working path, the failure of the protection path and the failure of the working path occurring simultaneously.

2. The method of claim 1, wherein the at least one working path utilizes one or more network resources and wherein, upon the second node switching to the protection path and establishment of the restored-working path, the one or more network resources are released.

3. The method of claim 1, wherein the restored-working path utilizes one or more network resources, and wherein, when the failure of the at least one working path is resolved such that the at least one working path is restored for data traffic, the data traffic is switched to the at least one working path and the one or more network resources of the restored-working path are released.

4. The method of claim 1, wherein the working path utilizes one or more network resources and wherein the restored-working path utilizes one or more of the network resources of the working path which have not failed.

5. The method of claim 1, wherein the restored-working path does not share network resources with the working path or the protection path.

6. The method of claim 1, wherein the second node switching to the protection path or the restored-working path requires less than 50 msec.

7. The method of claim 1, wherein the working path, the protection path, and the restored-working path are bidirectional.

8. The method of claim 1, wherein the working path, the protection path, and the restored-working path are unidirectional, and wherein only a direction of travel affected by the failure of the at least one working path is switched to the protection path.

9. A method comprising the steps of:
   transmitting, by circuitry of a first node in a mesh network, through an output interface of the first node, a first signal to an input interface of a second node in the mesh network, the first signal establishing a working path and a protection path between the first node and the second node, wherein the working path carries data traffic from the first node to the second node when there is no failure in the working path, wherein the second node simultaneously receives a duplicate of the data traffic from the protection path and wherein circuitry of the second node, when triggered by the failure of the working path, switches to the protection path;
   detecting, by circuitry of the first node in the mesh network, a failure in the working path and a failure in the protection path, the failure in the working path and the failure in the protection path occurring simultaneously; and
   transmitting, by circuitry of the first node, through the output interface of the first node, a second signal and a third signal to the input interface of the second node, the second signal establishing a restored-working path after determining the failure in the working path and the third signal establishing a restored-protection path after determining the failure in the protection path, wherein the restored-protection path is established after the restored-working path is established, wherein the restored-working path carries a duplicate of the data traffic transmitted on the restored-protection path from the first node to the second node.

10. The method of claim 9, wherein the restored-working path does not share network resources with the working path or the protection path.

11. The method of claim 9, wherein the restored-protection path does not share network resources with the working path or the protection path.

12. A node, comprising:
   an input interface;
   an output interface; and
   a control module controlling the input interface and the output interface, the control module adapted to:
      detect a failure a working path between the node and a second node in a mesh network, wherein the working path carries data traffic from the node to the second node in the network when there is no failure in the working path, wherein the second node simultaneously receives a duplicate of the data traffic from a protection path between the node and the second node and wherein the second node, when triggered by the failure of the working path, switches to the protection path; and
      establish through transmission of a first signal through the output interface of the node to an input interface of the second node, a restored-working path after determining the failure of the working path, wherein the at least one restored-working path carries a duplicate of the data traffic transmitted on the restored protection path;
      establish through transmission of a second signal through the output interface of the node to an input interface of the second node, a restored-protection path after determining a failure of the protection path and after the restored-working path is established, wherein the at least one restored-working path carries a duplicate of the data traffic transmitted on the restored protection path, and the failure on the protection path and the failure on the working path occurring simultaneously.

13. The node of claim 12, wherein the at least one working path utilizes one or more network resources and wherein, upon the second node switching to the protection path and establishment of the restored-working path, the one or more network resources are released.

14. The node of claim 12, wherein the restored-working path utilizes one or more network resources, and wherein, when the failure of the at least one working path is resolved such that the at least one working path is restored for data traffic, the data traffic is switched to the at least one working path and the one or more network resources of the restored-working path are released.

15. The node of claim 12, wherein the working path utilizes one or more network resources and wherein the restored-working path utilizes one or more of the network resources of the working path which have not failed.

16. The node of claim 12, wherein the second node switching to the protection path or the restored-working path requires less than 50 msec.

17. The node of claim 12, wherein the working path, the protection path, and the restored-working path are bidirectional.

18. The node of claim 12, wherein the working path, the protection path, and the restored-working path are unidirectional, and wherein only a direction of travel affected by the failure of the at least one working path is switched to the protection path.

19. A node comprising:
one or more input interface;
one or more output interface; and
one or more control module controlling the input interface and the output interface, the control module adapted to:
  transmit, through the output interface of the node, a first signal to an input interface of a second node in a mesh network, the first signal establishing a working path and a protection path between the node and the second node, wherein the working path carries data traffic from the node to the second node when there is no failure in the working path, wherein the second node simultaneously receives a duplicate of the data traffic from the protection path and wherein circuitry of the second node, when triggered by the failure of the working path, switches to the protection path;
detect failure in the working path;
transmit, through the output interface of the node, a second signal to the input interface of the second node, the second signal establishing a restored-working path after determining the failure in the working path, wherein the restored-working path carries a duplicate of the data traffic transmitted on the protection path from the node to the second node;
detect a failure in the protection path, the failure in the working path and the failure in the protection path occurring simultaneously; and
transmit, through the output interface of the node to the input interface of the second node, a third signal establishing a restored-protection path after determining the failure in the protection path, wherein the restored-protection path carries a duplicate of the data traffic transmitted on the restored-working path from the node to the second node, wherein the restored-protection path is established after the restored-working path is established.

* * * * *